United States Patent [19]
Johnson et al.

[11] 3,904,698
[45] Sept. 9, 1975

[54] STEROID SYNTHESIS

[75] Inventors: William S. Johnson, Portola Valley, Calif.; Ronald L. Markezich, Bloomfield, N.J.; Brian E. McCarry, East Palo Alto, Calif.

[73] Assignee: The Board of Trustees of Leland Stanford Junior University, Stanford, Calif.

[22] Filed: Aug. 17, 1972

[21] Appl. No.: 281,380

[52] U.S. Cl...... 260/617 R; 260/327 M; 260/340.9; 260/468 R; 260/488 R; 260/514 R; 260/586 R; 260/611 R; 260/617 E; 260/648 R
[51] Int. Cl.² .......................................... C07C 35/18
[58] Field of Search .................... 260/617 R, 617 E

[56] References Cited
OTHER PUBLICATIONS
Joshi et al., "Chem. Abstracts," 69, p. 59413q, (1968).

*Primary Examiner*—Donald G. Daus
*Assistant Examiner*—David B. Springer

[57] ABSTRACT

Synthesis of steroids by cyclization of a dienyne terminating at one end of the molecule in an acetylenic group and at the other end in a cyclohexene ring wherein the olefinic group forms an allylic group with a substituent such as a thioketal or hydroxy group. Invention includes novel synthesis of the cyclization substrate, novel substrate and novel intermediates, whereby resolution of racemic mixtures and the production of d, l and dl enantiomers are made possible.

1 Claim, No Drawings

STEROID SYNTHESIS

This invention relates to the synthesis of steroids and of intermediates which are useful in the synthesis of steroids. The invention includes novel and useful processes of synthesizing such products. Among the products are novel and useful intermediates and novel and useful steroids. The invention also includes procedures and products which result in intermediates which have chiral carbon atoms and can be resolved whereby the steroid end products may be made in the desired optically active form.

Heretofore (see Johnson, Gravestock and McCarry, J. Am. Chem. Soc. 93, 4332 (1971), and Johnson U.S. Patent application Serial No. 162,672, filed July 14, 1971, entitled "Steroid Total Synthesis") it has been found possible and useful to produce from an ylid I and an aldehyde II a precursor or substrate III which can be cyclized to produce a steroid IV thus.

wherein $R^o$ may be H or methyl and Y may be acyloxy, etc. The five membered A ring of IV can be opened and recyclized to produce a six membered A ring.

It is an object of the present invention to provide steroid syntheses by the same general technique but by a more facile method and including methods and intermediates which make resolution possible and enable one to synthesize a steroid having a particular optical activity according to choice.

These and other objects of the invention will be apparent from the ensuing description and the appended claims.

The general technique referred to above provides an ylid V and an aldehyde VI and reacts them by a Wittig reaction to produce a steroid cyclization substrate VII in the following manner:

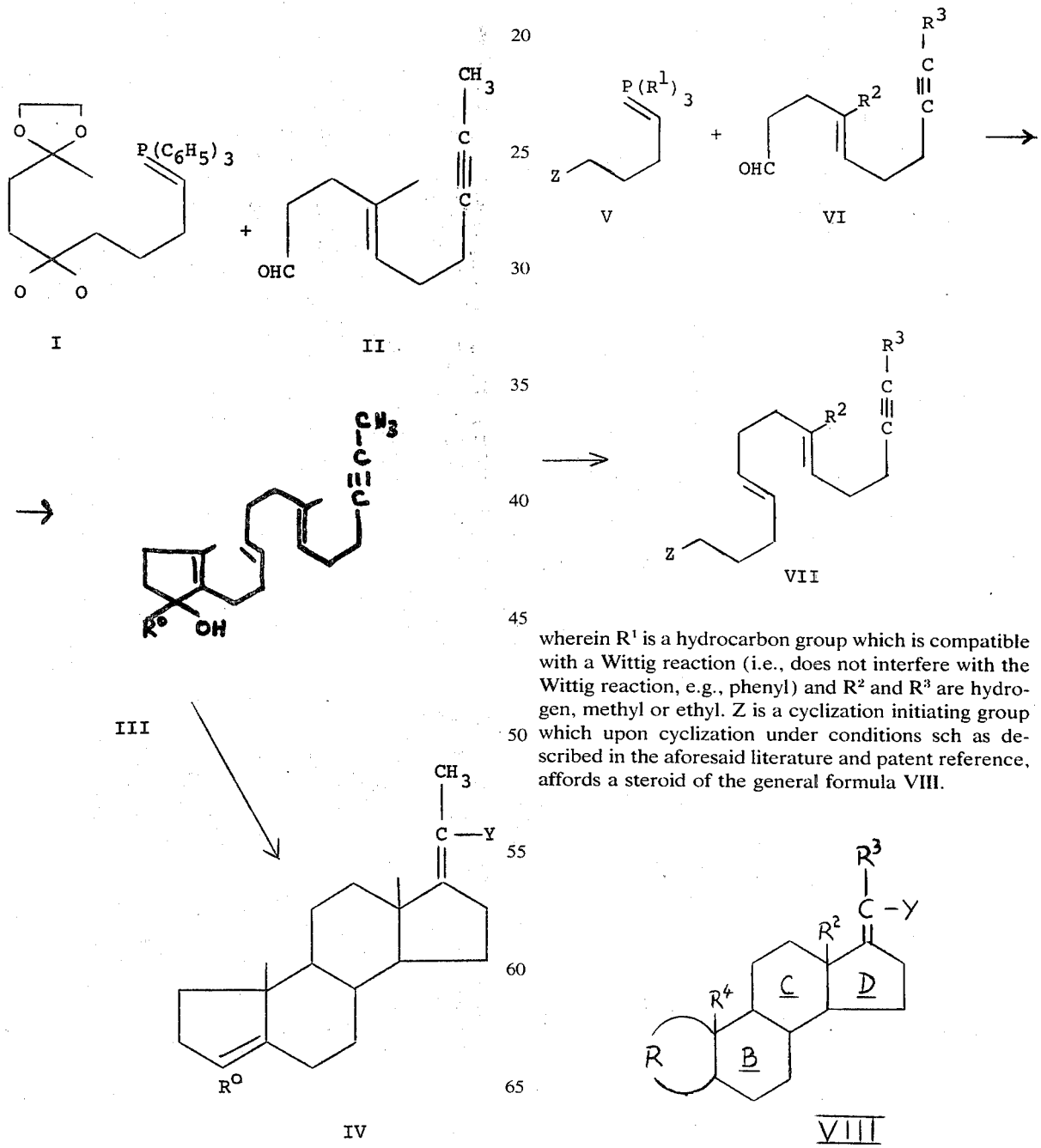

wherein $R^1$ is a hydrocarbon group which is compatible with a Wittig reaction (i.e., does not interfere with the Wittig reaction, e.g., phenyl) and $R^2$ and $R^3$ are hydrogen, methyl or ethyl. Z is a cyclization initiating group which upon cyclization under conditions sch as described in the aforesaid literature and patent reference, affords a steroid of the general formula VIII.

wherein $R^4$ is hydrogen, methyl or ethyl derived from Z, $R^2$ and $R^3$ are as defined above and R is a group derived from Z which is fused with the B ring to form the A-ring of the steroid.

We have discovered that by providing a particular class of ylid V a number of important advantages result such as the capability of optical resolution and the production of steroids having the desired optical activity, facility of synthesis and good yield. We have also discovered novel and useful methods of synthesizing the aforesaid ylid V.

The class of ylids is typified by a thioketal having the general formula

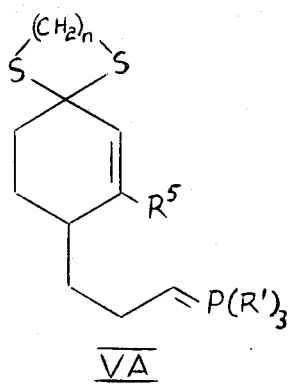

VA wherein $n$ is 2 or more (usually 2); $R^1$ is as defined above and $R^5$ is H, methyl or ethyl. The preferred ylid (which ordinarily is produced in solution from the corresponding phosphonium iodide X and is not isolated) has the following structure and is renumbered as 5a.

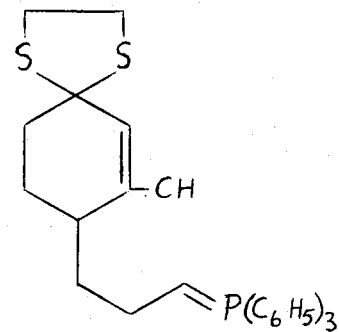

5a

The ylid 5a may be synthesized as set forth in Flow Sheet 1.

FLOW SHEET NO. 1

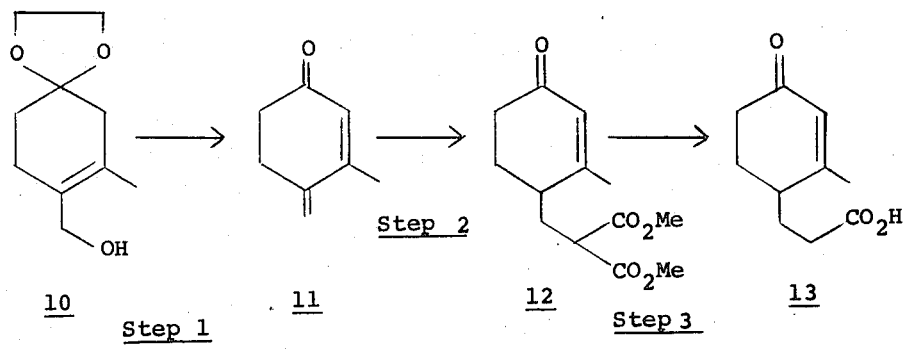

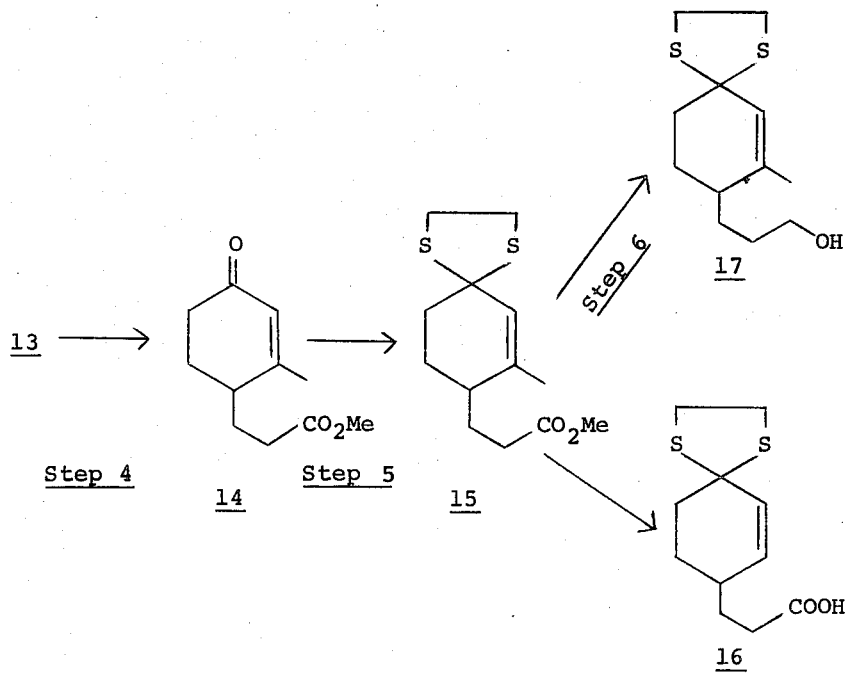

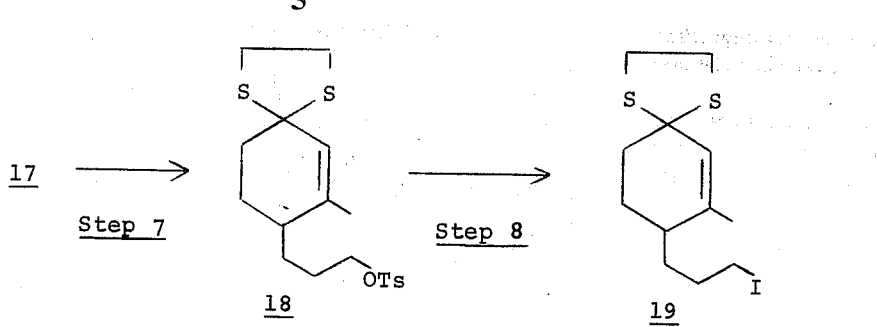
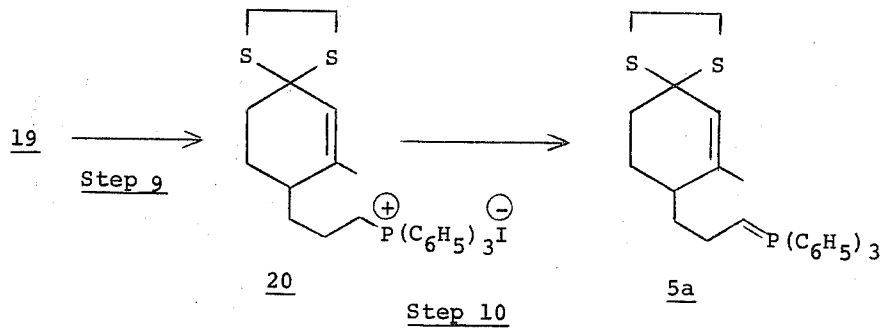
The aldehyde VI may be synthesized as described in the Johnson, Gravestock and McCarry paper and the U.S. patent application cited above or it may be synthesized as set forth in Flow Sheet No. 2 below.
FLOW SHEET NO. 2
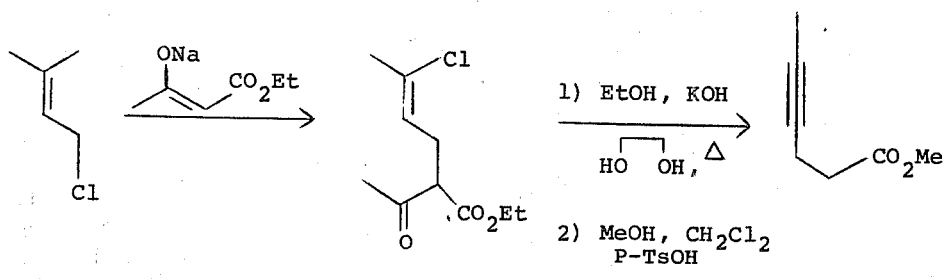
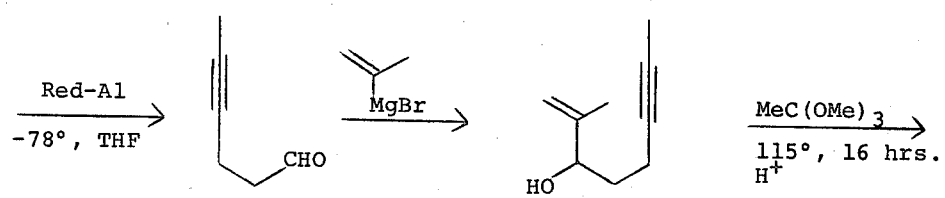
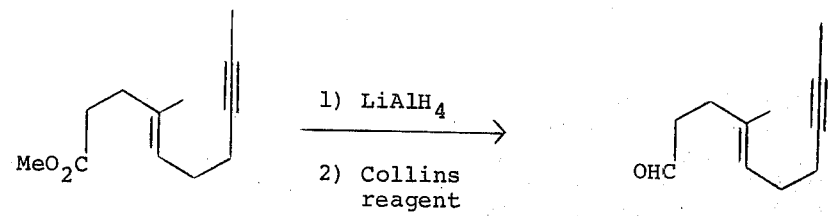

Details of preparation of and physical data regarding new compounds in Flow Sheet No. 1 are set forth in the specific examples below.

The ylid 5a and the aldehyde 6 may be condensed as described in literature and patent references cited above or as described in Example 12 below to form the steroid substrate 21 thus:

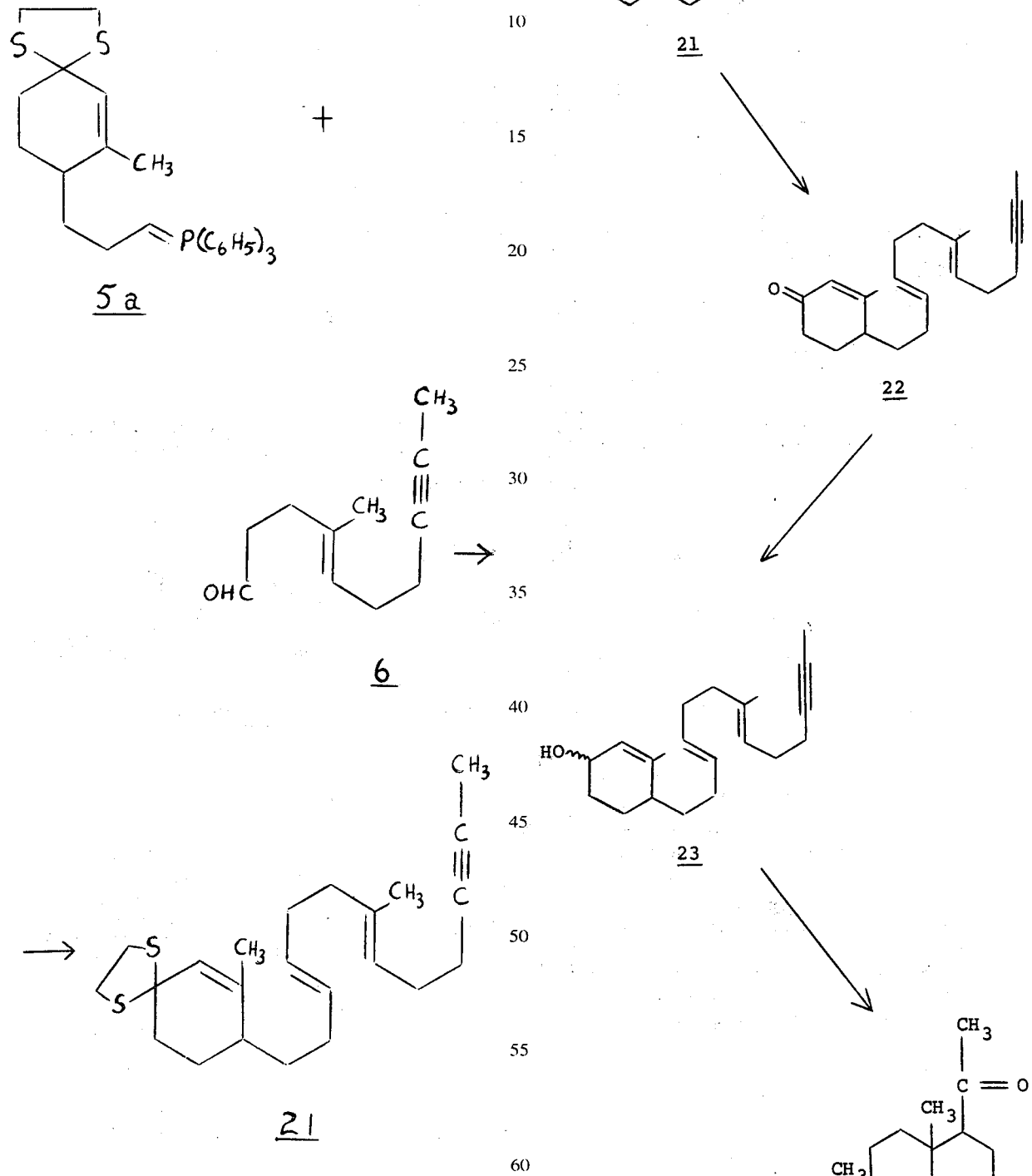

FLOW SHEET NO. 3

The steroid substrate 21 is an important precursor from which steroids may be prepared directly by cyclization of 21 or indirectly by modification of 21 followed by cyclization of the modified product.

Flow Sheet No. 3 illustrates how 21 may be modified and the modified product converted into a steroid.

Flow Sheet No. 4 illustrates how 21 may be cyclized directly to mixtures of steroids.

Flow Sheet No. 4

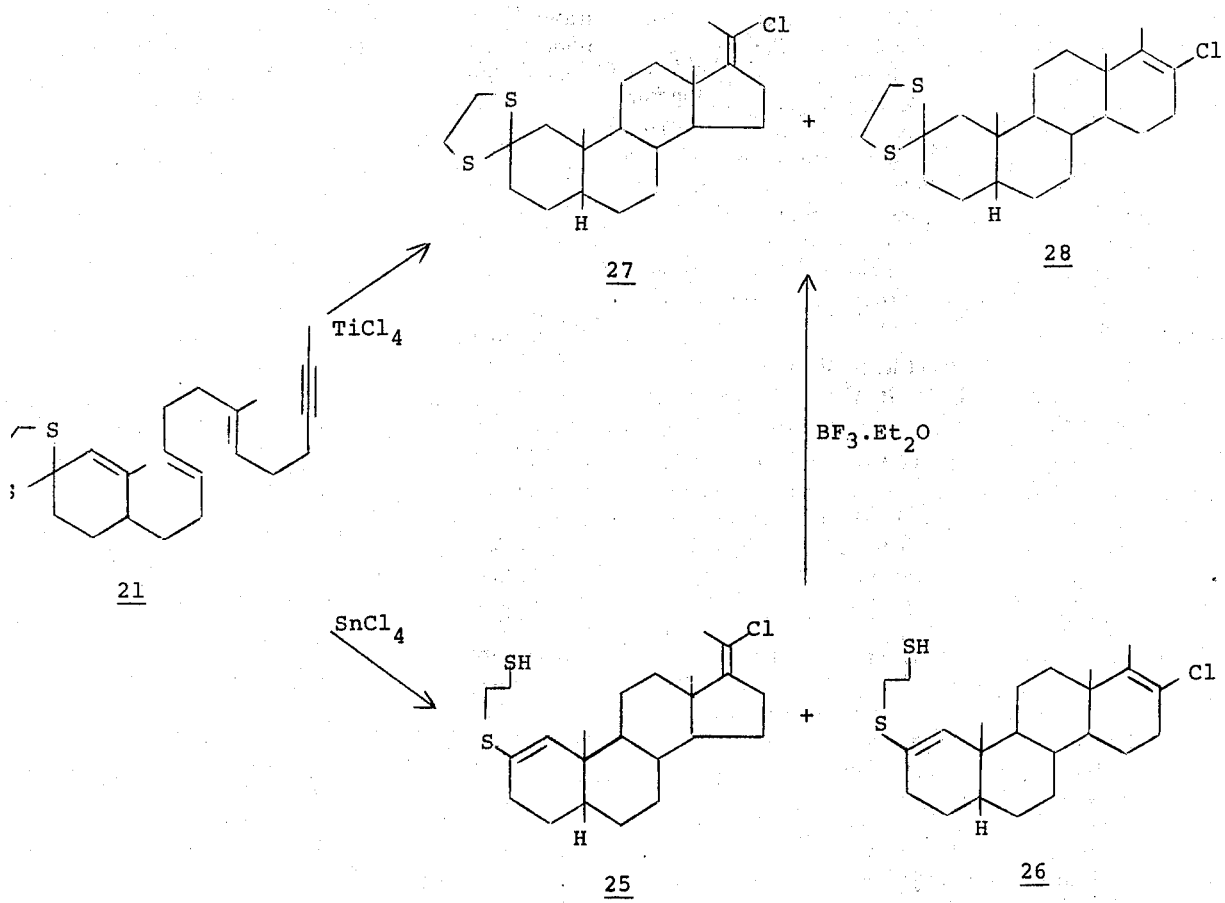

GENERAL DISCUSSION OF THE STEROID CYCLIZATION SUBSTRATE 21

It will be seen that the steroid cyclization substrate 21 may be modified to substitute a keto group for the thioketal group before cyclization (Flow Sheet No. 3) or it may be cyclized directly (Flow Sheet No. 4). In general the cyclization initiating group associated with the acetylenic group R — C ≡ C — (but at the opposite end of the dienyne chain) has the following characteristics: It is a cyclohexene ring in which the olefinic group of the ring forms part of an allylic group

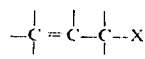

wherein X (which is a ring substituent) is a functional group (e.g., a bivalent functional group such as the thioketal group — S — CH$_2$ — CH$_2$ — S — , or a monovalent group such as hydroxyl. The essential characteristic is an allylic group wherein the functional substituent produces, under appropriate cyclizing conditions, a carbonium ion, at the site of the functional group to neighboring carbon of the neighboring trans olefinic group. This mechanism is set forth below:

form one of a pair of resonance forms (form A) whose other form (B) has the capacity to combine with the

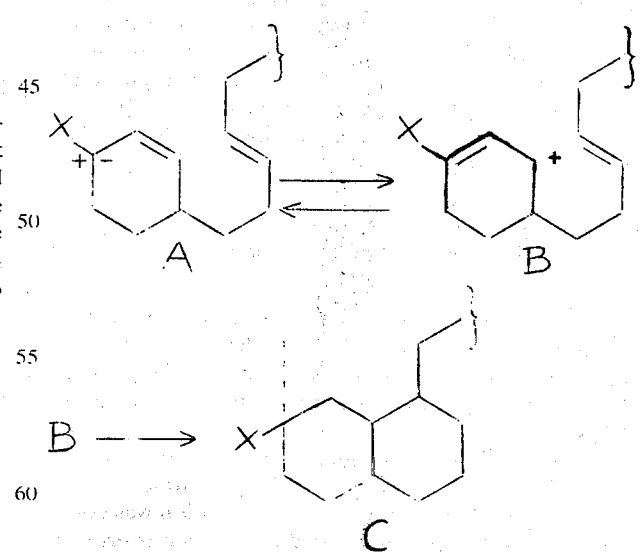

In C (which is the tetracylic steroid product) the dashed line represents a bond which provides a double bond between the C-1 and C-2 carbon atoms (as in 24 and 25 ) or where X is and remains bivalent, it constitutes one of the bonds of the bivalent group (as in 27).

The terminal cyclohexane group is, therefore, one having an olefinic group in the potential C-10, C-1 position of the resulting steroid which, together with a functional group in the potential C-2 position form an allylic group capable of producing a carbonium ion in two resonance forms, one of which has the positive, C+ at the potential C-10 positions and is, therefore, capable of reacting with the neighboring carbon of the neighboring trans olefinic group of the dienyne chain to form the B-ring of the steroid product. Other examples of the functional group X include alkoxy ($C_1 - C_1$ alkoxy), acyloxy (e.g., acetoxy), halogen (Cl, Br, I), etc. Where X is an oxygen or sulfur bearing group, anhydrous strong protonic acids such as trifluoroacetic acid, sulfonic acids (e.g., p-toluene sulfonic acid), HCl, etc. may be used. Lewis acids are also useful as shown in Flow Sheet No. 4. The remainder of the cyclohexene ring may be substituted by groups (e.g., lower alkyl) that do not interfere with the cyclization reaction.

RESOLUTION OF INTERMEDIATES AND PRODUCTION OF OPTICALLY ACTIVE STEROIDS FROM INTERMEDIATES

The natural steroids have the D-configuration. By appropriate steps in the methods of the present invention it is possible to produce racemic, D- or L-steroids as desired. Thus referring to Flow Sheet No. 1, the acid 16 corresponding to the ester 15 need not be isolated but, if an optically active end product is desired, it may be isolated and resolved. It will be seen that 16 contains a chiral carbon atom at the point of attachment of the propionic acid radical to the cyclohexene ring. This acid (which is produced in the racemic form) may be resolved by conventional techniques such as forming the salt of d- (or l) -methyl benzylamine and crystallization of the d- or l- salt of 16 respectively.

It will be noted that the keto acid 13 also has a chiral carbon atom (the same atom as in 16) and is susceptible to enolization and the enol does not have a chiral carbon, therefore it tends to racemize. By using conditions that suppress enolization or by reducing the keto group of 13 to hydroxyl and protecting the hydroxyl as by methylation, resolution at this stage can be effected.

In the following examples, except where otherwise stated, all compounds having chiral carbon atoms were prepared in the dl form. The same procedures apply to preparation of optically active forms provided resolution is accomplished at a suitable stage.

Example 1:

3-Methyl- 4-methylene-cyclohex-2-enone (11)

To 243 g (1.08 mole) of crude ethyl 3-methylcyclohex-3-enone-4 carboxylate ethylene ketal (A) in 600 ml of dry tetrahydrofuran contained in a 3-liter flask fitted with a mechanical stirrer, nitrogen inlet, and addition funnel was added slowly (with ice-bath cooling) over a 3 hour period 400 ml of "Red-Al" solution (Aldrich Chemical Co., 2.78 moles of hydride) in 200 ml of dry tetrahydrofuran. After the addition was complete the reaction mixture was allowed to stir overnight at room temperature. Excess Red-Al was destroyed by the addition of 10% aqueous sodium hydroxide and the precipitated aluminum salts were filtered off through celite. To the organic filtrate containing 3-methylcyclohex-3-enone-4-hydroxylmethyl ethyleneketal was added 1000 ml of 10% aqueous hydrochloric acid and this mixture stirred (mechanical stirrer) at room temperature under nitrogen for 4 hours. The reaction mixture was poured into a separatory funnel and extracted with ether (3 × 1000 ml). The ether extracts were washed with saturated sodium bicarbonate solution, saturated sodium chloride solution and the dried over anhydrous sodium sulfate. Filtration and concentration in vacuo afforded 116 g (89% yield) of the dienone 11 as a yellow oil. An analytical sample was distilled to afford a faint yellow liquid, bp 96°–98°/15 mm.

Anal. Calcd for $C_8H_{10}O$: C, 78.65; H, 8.25. Found: C, 78.73; H, 8.36.

Vpc on 3% XE-60/90° show one peak, $R_t$ 4 min.

IR (film) 5.98$\mu$(C=O)

NMR (CDCl$_3$): δ 2.08 (3H,S), 2.60 (4H,m), 5.37 (2H,S), and 5.92 (1H,S).

Example 2:

Methyl-2-carbomethoxy-3-(2-methyl-4-oxo-2-cyclohexene)propionate (12)

Into a 2-liter round-bottom flask equipped with a nitrogen inlet, magnetic stirrer, and addition funnel was placed 900 ml of methanol and 3.828 g (0.07 mol, Matheson, Coleman, and Bell) of sodium methoxide. After stirring for 15 minutes, 395 g (3 moles) of dimethyl malonate was added and this mixture stirred for 30 minutes. Then was added dropwise 110 g (0.9 mole) of 11 in 100 ml of methanol. The reaction mixture turned green which faded to a dark yellow. After stirring at room temperature for 19 hours (vpc of a aliquot showed no dienone remaining) the solution was poured into 2 liters of water and acidified to pH 1 with 10% aqueous hydrochloric acid. The diester was extracted with two-1000 ml portions of ether and 1000 ml of dichloromethane. The combined organic extracts were washed with saturated sodium chloride solution and dried over anhydrous sodium sulfate. Filtration and evaporation in vacuo afforded 484 g of an orange oil, a mixture of the substituted dimethyl malonate plus excess dimethyl malonate. (96% yield, the mixture should contain 45% by weight of the alkylated material).

Example 3:

Methyl-3-(2-methyl-4-oxo-2-cyclohexene)-propionate (14)

Into a 100 ml round-bottom flask equipped with a reflux condenser, magnetic stirrer, oil bath, and nitrogen inlet was placed 20.335 g of a ca. 45/55 mixture of 12 (ca. 9.02 g, 35.5 mmole) and dimethyl malonate (ca. 11.31 g), 25 ml of glacial acetic acid, 25 ml of water, and 5 ml of concentrated hydrochloric acid. This mixture was refluxed for 19 hours, cooled, and extracted with dichloromethane (3 × 100ml). The organic extracts were washed with saturated sodium chloride solution and dried over anhydrous sodium sulfate. Filtration and evaporation in vacuo afforded 8.109 g of a brown oil. The crude acid was esterified according to the procedure of Clinton and Laskowski. Into a 100 ml round-bottom flask was placed the crude acid, 30 ml of dichloromethane, 12 ml (0.3 mole) of methanol, and 0.1 g of p-toluenesulfonic acid. The mixture was refluxed for 17 hours, and then the cooled reaction mixture was washed with water, saturated sodium bicarbonate solution, and saturated sodium chloride solution, and dried over anhydrous sodium sulfate. Filtration and concentration in vacuo afforded 5.685 g of a brown liquid. Distillation afforded 4.010 g (58% yield)

of a light yellow liquid, bp 115°–118°/0.15 mm.

Anal. Calcd for $C_{11}H_{16}O_3$: C, 67.32; H, 8.22; Found: C, 67.38%; H, 8.19%

Vpc 3% XE-60/172°
4 min. 97%
3 min. 2%
2 min. 1%

IR (film): $6.00\mu$(C—O), $5.76\mu$(C=O)
NMR (CDCl$_3$): δ2.00 (3H,S), 3.67 (3H,S), 5.80 (1H,S)

Example 4: Methyl 3-(2-methyl-4-oxo-2-cyclohexene)-propionate ethylene thioketal (15)

A. Into a 250 ml round-bottom flask fitted with a magnetic stirrer and drying tube was placed 6.027 g (30.8 mmole) of 14, 100 ml of chloroform and 10 ml of ethanedithiol followed by the addition of 2 ml of boron trifluoride etherate. The solution turned yellow and water started to separate. After stirring at room temperature for 5.5 hours the reaction mixture was poured into 200 ml of water followed by 300 ml of ether. The two layers were separated and the organic portion washed with 10% aqueous sodium hydroxide (2 × 100 ml), saturated sodium chloride solution (1 × 200 ml), and dried over anhydrous sodium sulfate. Filtration and concentration in vacuo afforded 8.235 g of a yellow-orange liquid. Bulb-to-bulb distillation at 180°/0.025 mm afforded 7.949 g (95% yield) of the thioketal 15 as a light yellow liquid.

B. Into a 2-liter round-bottom flask fitted with a reflux condenser, magnetic stirrer, heating mantle, and nitrogen inlet was placed 463 g of a ca. 45/55 mixture of 14 ca. (208 g, 0.82 mole) and dimethyl malonate ca. (255 g), 500 ml of glacial acetic acid, 500 ml of water, and 100 ml of concentrated hydrochloric acid. The mixture was refluxed for 22 hours, cooled, and poured into 2 liters of water. The acid was extracted with three-1000 ml portions of dichloromethane, the organic extracts washed with saturated sodium chloride solution and concentrated in vacuo to 1000 ml. The crude acid was esterified according to the procedure of Clinton and Laskowski. Into a 2-liter round-bottom flask was placed the dichloromethane solution of the acid, 360 ml of methanol (9 moles), and 3 g of p-toluenesulfonic acid. This mixture was refluxed for 21 hours, and then the cooled reaction mixture was washed with water, saturated sodium bicarbonate solution, and saturated sodium chloride solution. The dichloromethane solution containing the keto-ester was placed into a 2-liter round-bottom flask followed by 200 ml of ethanedithiol. The flask was fitted with a drying tube and magnetic stirrer and 40 ml of boron trifluoride etherate was added. The solution was stirred overnight (15 hours) and then poured into a separatory funnel. The organic layer was washed with two-500ml portions of 10% aqueous sodium hydroxide, saturated sodium chloride solution (1 × 500 ml), and dried over anhydrous sodium sulfate. Filtration and evaporation in vacuo afforded 197 g of brown liquid. Distillation afforded 92.4 g (0.34 mole, 41% yield) of the thioketal-ester 15 as a clear liqiid, liquid, 173°–174°/0.15 mm; 144°–146°/0.02 mm.

Anal. Calcd for $C_{13}H_{20}O_2S_2$: C, 57.34; H, 7.40 S, 23.50; Found: C, 57.22; H, 7.28; S, 23.57

Vpc 3% XE-60/190°
4 min. 1%
5.5 min. 99%

IR (film): $5.73\mu$(C=O);
NMR (CDCl$_3$): δ1.70 (3H,S), 3.33 (4H,S), 3.68 (3H,S), 5.68 (1H,S)

Example 5: 3-(2-methyl-4-oxo-2-cyclohexene)-propionic acid ethylene thioketal (16)

Into a 500 ml round-bottom flask equipped with a magnetic stirrer and nitrogen inlet was placed 56.1 g (0.206 mole) of 14, 300 ml of methanol, and 19.7 g. (0.30 mole) of 85% potassium hydroxide in 75 ml of water. After stirring at room temperature for 24 hours the mixture was poured into a separatory funnel followed by 400 ml of water. The mixture was extracted with 200 ml of ether and the aqueous solution acidified to pH 1 with 10% aqueous hydrochloric acid. The acid was extracted with three-300 ml portions of dichloromethane. After washing with saturated sodium chloride and drying over anhydrous sodium sulfate, filtration and concentration in vacuo afforded 53.7 g (100% yield) of the acid as thick light-brown oil.

Anal. Calcd for $C_{12}H_{18}O_2S_2$: C, 55.81; H, 7.02; S, 24.78; Found: C, 55.90; H, 7.02; S, 24.91

IR (film): $5.84\mu$(C=O)
NMR (CDCl$_3$): δ1.71 (3H,S), 3.33 (4H,S), 5.63 (1H,S), 11.22 (1H,S)

Example 6: Resolution of the Acid 16 into d- and l-Salts

To a solution of 53.2 g (0.206 mole) of d,1-acid 16 in 900 ml of hot ethyl acetate contained in a 1-liter Erlenmeyer flask was added 25.157 g (0.207 mole) of d-α-methylbenzylamine in 100 ml of hot ethyl acetate. The resulting solution was heated to boiling for a few minutes and then allowed to cool. A seed crystal was added and the solution cooled slowly to room temperature. Filtration afforded 31.5 g (0.083 mole, 40%) of light tan needles [α]$_D$ free acid + 10.1°. Another recrystallization from 400 ml of hot ethyl acetate, cooling slowly to room temperature, afforded 24.8 g (0.065 mole) of needles [α]$_D$ of free acid + 13.1°. One more recrystallization from 340 ml of hot ethyl acetate gave 20.5 g (0.054 mole, 26%) of white needles, mp 107°–113°, [α]$_D$ of free acid + 13.7°.

Anal. Calcd for $C_{20}H_{29}NO_2S_2$: C, 63.31; H, 7.70; N, 3.69; S, 16.87; Found: C, 63.42; H, 7.63; N, 3.73; S, 16.88

The mother liquor from the first recrystallization was concentrated to 700 ml and cooled to 0°. Cotton-like crystals separated which are the salt from the l-acid. These were not collected but this mixture was treated with 10% aqueous hydrochloric acid to liberate the free acid. To a solution of ca. 32 g (0.123 mole) of l-enriched acid l-16 in 400 ml of hot ethyl acetate was added 15.30 g (0.126 mole) of l-α-methylbenzylamine in 100 ml of hot ethyl acetate. The resulting solution was heated to boiling for a few minutes and then allowed to cool slowly to room temperature. Filtration afforded 29 g (0.076 mole, 37%) of off-white needles, [α]$_D$ of free acid −8.15°. Another recrystallization from 400 ml of hot ethyl acetate, cooling slowing to room temperature, afforded 20.8 g (0.055 mole) of needles, [α]$_D$ of free acid −12.2°. One more recrystallization from 320 ml of hot ethyl acetate gave 16.2 g (0.043 mole, 21%) of off-white needles, mp 107°–112°, [α]$_D$ of free acid −14.2°.

Anal. Calcd. for $C_{20}H_{29}NO_2S_2$: C,63.31; H,7.70; N,3.69; S,16.87 Found: C, 62.15; H, 7.53; N, 3.68; S, 17.09

Example 7: d-3-(2-methyl-4-oxo-2-cyclohexene)-propionic acid ethylene thioketal (d-16)

To 19.762 g (0.052 mole) of salt d-17 suspended in 300 ml of ethyl acetate was added 200 ml of 10% aqueous hydrochloric acid. This mixture was stirred for 10 minutes and then poured into a separatory funnel and separated. The organic layer was washed with brine and dried over anhydrous sodium sulfate. Filtration and evaporation in vacuo afforded 13.904 g (104% yield) of the acid d-16 as a light tan oil $[\alpha]_D + 13.7°$.

Bulb-to-bulb distillation, 169°–173°/0.015 mm afforded an analytical sample as a clear oil.

Anal. Calcd for $C_{12}H_{18}O_2S_2$: C, 55.81; H, 7.02; S, 24.78; Found: C, 55.94; H, 7.12; S, 24.89.

Example 8: 3-(2-methyl-4-oxo-2-cyclohexene)-propyl alcohol ethylene thioketal (17)

The thioketal methyl ester (15), 35.74 g (131 mmoles), was dissolved in 300 ml dry THF in an oven-dried 1 liter flask equipped with a magnetic stirring bar, addition funnel and an $N_2$ inlet. The solution was cooled to 0° and 50 ml (340 mmoles $H^-$) of Redal, (sodium bis-(2-methoxyethoxy) aluminum hydride in benzene) diluted with 60 ml dry THF was added from the funnel over 15 minutes. The solution was stirred for 4 hours at 0°. After this time the reaction mixture was carefully quenched with 5% aqueous sodium hydroxide by dropwise addition until a granular precipitate was obtained. The almost clear supernatant was decanted and the aluminum salts were washed with ether. The organic solvent was evaporated in vacuo and the residue was taken up in ether. The ether solution was extracted with water (2 × 500 ml) and the aqueous layer were extracted with ether (2 × 200 ml). The combined ether layers were washed with saturated brine and then dried over anhydrous potassium carbonate. Evaporation of the solvent in vacuo left 32.2 g pale yellow oil (131 mmoles, quantitative recovery) of the thioketal alcohol (17). A sample was purified by the silica gel (ethyl acetate) $R_f$ 0.48, and distillation bp 180°/0.050 mm.

| Analysis: | Calc'd for: | $C_{12}H_{20}OS_2$ | C,59.00; H,8.25; S,26.25 |
|---|---|---|---|
| Found: | | dl | C,59.15; H,8.16; S,26.20 |
| | | d | C,58.76; H,8.05; S,26.54 |
| | | l | C,58.89; H,8.39 |

NMR (CDCl$_3$)  1.668  (s,  3H,  C$\underline{H}_3$(R)C=)
 3.31  (s,  4H,  -S-C$\underline{H}_2$C$\underline{H}_2$-S-)
 3.64  (m,  2H,  -C$\underline{H}_2$-OH)
 5.60  (s,  1H,  $\underline{H}$(R)C=)

IR (liquid film): 2.97μ (OH) 3.41 (CH)
6.08 (>C=C<) 7.85, 9.50, 11.80
$[\alpha]_D^{22} + 24.3°$ (CHCl$_3$)
tlc: Et$_2$O/hexane (1/1) $R_f$ 0.15

Example 9: 3-(2-methyl-4-oxo-2cyclohexane)-propanol tosylate ethylene thioketal (18)

In an oven-dried 250 ml flask was placed p-toluenesulfonyl chloride (recrystallized from hexane/chloroform; 36 g 0.188 mole, 1.42 equivalents) and 50 ml dry pyridine. The mixture was stirred and cooled in an ice water bath. Then the above crude thioketal alcohol (17) was dissolved in 30 ml dry pyridine and added slowly to the chilled tosyl chloride/pyridine mixture. Transfer of the alcohol was completed with two pyridine washings (15 ml then 5 ml). Soon after the alcohol solution had been added the mixture became a very pale yellow, clear solution but within five minutes a fine white precipitate of pyridinium hydrochloride began to come out of solution. After stirring two hours at 0° 8 ml of 85% lactic acid (75 mmoles) was added dropwise via syringe. After stirring an additional 30 minutes at 0° the reaction mixture was poured into 1 liter of 10% HCl overlaid with ether (500 ml). The ether layer was extracted with another liter of 10% HCl. The combined aqueous layers were then extracted with ether (2 × 200 ml). The ether layers were washed successively with $H_2O$, saturated NaHCO$_3$ and saturated brine. After drying over anhydrous potassium carbonate the solvent was evaporated in vacuo leaving the thioketal tosylate (18) a very pale yellow viscous oil, 48.6 g (126.5 mmoles, 96% yield). This product was used directly in the next step. A sample of the tosylate (18) was purified by chromatography on Florisil with 10% ether in hexane.

Analysis: Calc'd for $C_{19}H_{26}S_2O_3$: C, 57.25; H, 6.57; Found: C, 57.17; H, 6.54

Spectral Data:

NMR: (CDCl$_3$)  1.61  (s,  3H, C$\underline{H}_3$(R)C=)
 2.45  (s,  3H, C$\underline{H}_3$-Ar)
 3.31  (s,  4H, -S-C$\underline{H}_2$C$\underline{H}_2$-S-)
 4.06  (t,  2H, J=6Hz, -C$\underline{H}_2$-OTs)
 5.62  (s,  1H, $\underline{H}$(R)C=)
 7.39,7.86  (,  2H each, J=8Hz, H's on aromatic ring)

IR: (CHCl$_3$ sol'n) 3.41 (CH)
7.36, 8.40, 8.51 (tosylate bands)
$[\alpha]_D^{22} + 18.5°$ (CHCl$_3$)
$[\alpha]_D^{22.5} - 18.6°$ (CHCl$_3$)
tlc: Et$_2$O/hexane (2/1) $R_f$ 0.54

Example 10: 1-Iodo-3-(2-methyl-4-oxo-2-cyclohexene)-propane ethylene thioketal (19)

Excess sodium iodide was added to 180 ml acetone and stirred at 23° for 30 minutes before the flask was set aside and allowed to settle and cool to room temperature. This sodium iodide saturated acetone was added to the above crude thioketal tosylate (18) and stirred at 23°. Then 0.5 ml of diisopropylethylamine was added to the stirred suspension to prevent isomerization of the olefinic bond. After 2½ hours half of the acetone was evaporated in vacuo before the reaction mixture was poured into 1 liter of water overlaid with 500 ml ether. The aqueous layer was extracted with ether (2 × 200 ml). The combined ether layers were washed with saturated sodium bicarbonate and saturated brine. After drying over anhydrous potassium carbonate the solvent was evaporated in vacuo to yield the thioketal iodide (19), a pale yellow viscous oil, 41.9 g. The crude iodide was applied to 250 g of 100-200 mesh Florisil and eluted with 5% ether in hexane; 39.45 g (0.112 moles, 89% yield) of clear colorless oil was collected. This represented an overall conversion of 85.5% from the thioketal ester (15).

Analysis: Calc'd for: $C_{12}H_{19}I$: C, 40.69; H, 5.41; I, 35.83 Found: C, 41.18; H, 5.39; I, 35.75
Spectral Data:

NMR: (CDCl$_3$)  1.69δ  (s, 3H, CH$_3$(R)C=)
3.19  (t, 2H, J=6Hz, -CH$_2$-I)
3.32  (s, 4H, -S-CH$_2$CH$_2$-S-)
5.61  (s, 1H, H(R)C=)

IR: (liquid film) 3.41 (CH)
6.09 (>C=C<)
7.89, 8.19, 8.60, 11.80
tlc: Et$_2$O/hexane (2/1) R$_f$ 0.70
$[\alpha]_D^{22} + 24.1°$ Example 11:
3-(2-methyl-4-oxo-2-cyclohexene)-propane-1-triphenylphosphonium iodide ethylene thioketal (20)

In a 100 ml flask were placed 12.3 g (34.8 mmol) of the thioketal iodide (19), 12.8 g triphenylphosphine (1.4 equivalents) and 15 ml dry acetonitrile (distilled from CaH$_2$). All three components were necessary to effect complete solution at 50°. Huenig's base (diisopropylethylamine 1.0 ml) was added and the reaction vessel was flushed with dry N$_2$ and then placed in a 50° oil bath. After 18 hours the homogeneous reaction mixture was diluted with 35 ml dry methylene chloride then poured into swirling hexane (250 ml). A yellow-white gummy product separated from the hexane solution. After a little swirling the supernatant was decanted and the gummy product washed with hexane (2 × 30 ml). The hexane washings made the product gummier and far less mobile. Excess solvents were removed by aspirator. The crude product swelled to give a solid foam (volume about 600 ml) which when dry was broken down to a powder with a spatula. After the bulk of the volatiles were removed by aspirator the product was dried in vacuo then placed in a drying pistol at 68° (hexane)/0.010 mm to yield an ivory white powder 20.5 g (33.3 mmoles, 96% yield).

| Analysis: | Calc'd for: | $C_{30}H_{35}IPS_2$ | C,58.44; | H,5.56; | I,20.58 |
|---|---|---|---|---|---|
| Found: | | l | 58.38; | 5.62; | 20.52 |
| | | dl | 58.47; | 5.69; | 20.16 |
| | | d | 58.34; | 5.66; | 20.65 |

Spectral Data:

NMR: (CDCl$_3$)  1.61  (s, 3H, CH$_3$(R)C=)
3.29  (s, 4H, -S-CH$_2$CH$_2$-S-)
5.51  (s, 1H, H(R)C=)
7.70  (m, 15H, -Pφ$_3$)

IR: (CHCl$_3$ sol'n) 3.40 (CH)
6.31 (aromatic CH)
8.32, 9.02, 14.05 (all strong)
mp:
dl 87–91.5°
l 91–93.5°
d 88–90°
$[\alpha]_D^{22.5} - 4.79°$(CHCl$_3$)
$[\alpha]_D^{22} + 5.08°$ (CHCl$_3$)

Example 12:
7-methyl-13-(2-methyl-4-oxo-2-cyclohexene)-trideca-trans, trans-6,10-dien-2-yne ethylene thioketal (21)

In an oven-dried 250 ml flask equipped with a magnetic stirring bar was placed 15.92 g (25.9 mmoles) of the phosphonium salt (20). After flushing the flask with dry nitrogen, 50 ml of dry THF were added. The partially dissolved salt was stirred at 23° as phenyllithium in THF was added via syringe until a permanent yellow was obtained (indicating a small concentration of the phosphorous ylid 5a).

The phenyllithium was prepared by the procedure of Gilman (H. Gilman, R. G. Jones, Organic Reactions VI, p. 352). When the dark filtered solution of the phenyllithium in ether was placed in a freezer at −17°, the phenyllithium was observed to crystallize in large white crystals. The supernatant ether was decanted and dry THF was added. The concentration of phenyllithium was determined by the method of Watson and Eastham (J. Organomet. Chem., 9, 165(1967)), which uses 1,10-phenanthroline (Aldrich) as a carbon base indicator. Solutions of phenyllithium in THF when stored at freezer temperatures (−15° to −20°) are stable and hold their titer within 5% for two months or longer.

After the permanent yellow color was obtained 1.00 equivalents of phenyllithium in THF (1.69 M, 15.3 ml, 25.9 mmoles) was added causing the temperature of the mixture to rise. Complete dissolution to a clear cherry red solution occurred within a minute. The solution of the ylid (5a) was cooled to −70° in a dry ice-acetone bath. After stirring 15 minutes at −70° the aldehyde 6 (4.25 g, 25.9 mmole) in 5 ml dry THF was added dropwise via syringe. The color of the solution lightened to a pale orange as the solution was stirred for 15 minutes. Then 20 ml of phenyllithium in THF (1.3 equivalents) was added via syringe generating a very dark red solution of the betaine ylid. Sufficient dry ether (90 ml) was then added to adjust the THF/ether ratio to 1/1. The temperature was allowed to rise to −30°. After stirring 10–15 minutes at −30° the ylid was quenched with methanol to give a pale tan mixture which was allowed to warm to 23° and stand overnight.

The reaction mixture was added to 600 ml hexane and after stirring a few minutes the precipitated triphenylphosphine oxide was allowed to settle and the slightly cloudy supernatant decanted. The precipitated oxide was washed with 100 ml hexane. The solvent was evaporated in vacuo leaving a yellow oil. The crude product was applied to a 100 g column of Florisil (100–200 mesh) and eluted with hexane (to remove most of the biphenyl) followed by 5% ether in hexane. A total of 6.917 g of thioketal (21) was collected (18.5 mmoles, 71.5% yield). Vpc analysis shows less than 2% of the β,γ-unsaturated isomer and about 1% cis olefin. A sample was purified by the silica gel (benzene) R$_f$ 0.55 and distillation bp 180/25μ.

| Analysis: | Calc'd for: | $C_{22}H_{34}S_2$ | C, 73.74; | H,9.15 |
|---|---|---|---|---|
| Found: | | dl | 74.12 | 9.23 |
| | | l | 73.98 | 9.07 |
| | | d | 73.88 | 8.95 |

Spectral Data:

NMR: (CDCl$_3$)  1.60  (s, 3H, vinyl CH$_3$)
1.66  (s, 3H, vinyl CH$_3$ in ring)
1.76  (s, 3H, —≡—CH$_3$)

| 3.31 | (s, 4H, | thioketal) |
| 5.20 | (m, 1H, | ∈\/\∈ HH |
| 5.41 | (m, 2H, | ∈\/\∈ H |
| 5.60 | (s, 1H, | vinyl H in ring) |
| IR: (CHCl₃ sol'n) 3.32 μ, | 3.41, | 3.49 (CH) |
| 6.02 | 6.07 | (>=<) |
| 7.25 (w), | 7.82 | (w) |
| 10.32 (m, | trans /\\/ | |

Mass spectrum (Atlas)
M⁺ 374
M - 28 (thioketal cleavage)
tlc:
  Ether/hexane (1/1) $R_f$ 0.65
  benzene $R_f$ 0.57
$[\alpha]_D^{22} = -19.7°$
$[\alpha]_D^{22} = +21.0°$ For cyclization of 21 to occur to afford a steroid, it is necessary that both olefinic groups of the dienyne segment be trans groups. The trans group of the aldehyde 6 is assured by its method of synthesis. The trans character of the olefinic groups which forms the C-8 and C-9 portions of the steroid is assured by its method of synthesis above described which includes steps which will be recognized as the Schlosser modification of the Wittig synthesis; see Schlosser, Angewandte Chemie, International Edition, 5, p. 126 (1966).

Example 13:
7-Methyl-13-(2-methyl-4-oxo-2-cyclohexene)-trideca-trans, trans-6,10-dien-2-yne (22)

In a 250 ml flask equipped with magnetic stirrer were placed 4.749 g of the thioketal (21) (12.7 mmole), 160 ml acetonitrile, 32 ml H₂O and 18 ml methyl iodide. This solution was stirred under an atmosphere of dry nitrogen at 45° for 11 hours. When an aliquot was removed and analyzed by vpc, the hydrolysis was found to be complete. The reaction mixture was poured into 350 ml ether and washed with dilute Na₂S₂O₃ (2 × 400 ml). After extraction of the aqueous layers with either the usual work-up was followed. This left a yellow oil which was chromatographed on 100 g, 100-200 mesh Florisil. The column was eluted with hexane followed by hexane containing 10% ether then 20% ether. A total of 3.249 g of the α,β-unsaturated ketone (22) was obtained (10.9 mmoles, 86% yield). An analytical sample was prepared by treatment with Raney nickel in ethyl acetate/ethanol for one-half hour followed by evaporative distillation at 160°/25

Analysis: Calc'd for C₂₁H₃₀O: C, 84.51; H, 10.13;
Found: dl: C, 84.61; H, 10.34
Spectral Data:

| NMR: (CDCl₃) | 1.58δ | (s, 3H, | vinyl CH₃) |
| | 1.73 | (s, 3H, | C C-CH₃) |
| | 1.93 | (s, 3H, | vinyl CH₃ of ketone) |
| | 5.18 | (m, 1H, | ∈\/\∈ HH |
| | 5.41 | (m, 2H, | ∈\/\∈ H |
| | 5.80 | (s, 1H, | vinyl H of ketone) |
| IR: (CHCl₃ sol'n) | 3.32 μ, | 3.41, | 3.49 (CH) |
| | 6.02 | | 7.24, 7.99 |
| | 10.32 | (trans /\\/ ) | 11.65 |

UV: $\lambda_{max}^{MeOH}$ 238Mμ (E = 15,300)
$[\alpha]_D^{22} = +58.4°$
$[\alpha]_D^{22} = -58.0°$ Example 13A: Modified Hydrolysis of Thioketal 21

The method of Example 13 causes enolization of the ketone 22, therefore racemizes the thioketal 21 if that compound is used in resolved, optically active form. The procedure of this present example avoids or represses enolization and results in an optically active ketone 22.

Into a 10 ml round-bottom flask was placed 58 mg (0.155 mmole) of l-thioketal 21 from acid with $[\alpha]_D$ −10.1°), 5 ml of dimethylformamide, 350μ1 (800 mg, 5.6 mmole) of methyl iodide, 1 ml of water, and 26 mg (0.26 mmole) of calcium carbonate. This mixture was stirred at room temperature for 42 hours. Vpc of an aliquot on 3% XE-60 /225° showed ketone 22 (76%, $R_t$ 5 min), 6% of unreacted thioketal ($R_t$ 13 min), and 19% of an unknown compound at $R_t$ 17 min. The reaction mixture was poured into a separatory funnel followed by ether. The mixture was washed with brine (pH of aqueous portion is 3–4) and dried over anhydrous sodium sulfate. Filtration and evaporation in vacuo afforded 52 mg of a yellow oil. This material was adsorbed onto a silica gel plate (10 cm × 20 cm × 0.1 cm) and eluted with ethyl acetate: benzene (1:4) to afford 24 mg (52% yield) of the ketone 22 as a clear oil, $[\alpha]_D$ −41.0°.

Example 14:
7-Methyl-13-(2-methyl-4-hydroxy-2-cyclohexene)trideca-trans, trans-6,10-dien-2-yne (23)

In an oven dried 100 ml flask equipped with a magnetic stirrer bar were placed 2.158 g (7.24 mmoles) of the unsaturated ketone (22) and 25 ml dry THF. This solution was stirred under dry nitrogen and cooled to 0°. A solution of 0.8 ml Redal in 5 ml dry THF (1.5 equivalents of H⁻) was added slowly via syringe to the chilled solution of ketone (22). The nearly colorless solution was stirred for 1 hour at 0°. After this time the excess Redal was carefully destroyed with 5% aqueous sodium hydroxide until a granular precipitate was formed. The almost clear supernatant was decanted and the salts washed with ether. The usual workup yielded the allylic alcohol (23), a very pale yellow oil, 2.128 g (99% yield). There was no unreacted ketone by infrared spectroscopy. A sample of the crude product was purified by chromatography on No. 5 basic alumina (Woelm) with 20% ether in hexane as eluent. The last traces of solvent were removed at 23°/10μ.

Analysis: Calc'd for C₂₁H₃₂O: C, 83.94; H, 10.73;
Found: dl: C, 84.00; H, 10.46
Spectral data:

| NMR: (CDCl₃) | 1.60 δ | (s, 3H, | vinyl CH₃) |
| | 1.67 | (s, 3H, | vinyl CH₃ in ring) |
| | 1.76 | (s, 3H, | C ≡ C — CH₃) |
| | 5.18 | (m, 1H, | |
| | 5.42 | (m, 3H, | other vinyl H's) |

IR:(liq. film)
3.00μ (OH); 3.41, 3.49 (CH);
6.04 (C=C), 7.26, 9.65, 10.32

Example 15:
Δ¹-pregnen-20-one    (24)

In an oven-dried 500 ml 3-necked flask equipped with a serum cap, a stopcock adapter, magnetic stirrer bar and a dry ice/acetone condenser was placed 2.50 g (8.33 mmoles) of the allylic alcohol (23). Then 250 ml of 1,1 difluoroethane (Matheson Gas, Genetron 152 A, bp. −25°) was introduced via the stopcock adapter. The allylic alcohol (23) is virtually insoluble in the difluoroethane. Then 30 g of ethylene carbonate (12% by weight; recrystallized from the melt) was added. About 80% of the ethylene carbonate and most of the substrate dissolved. Then 20 ml of trifluoroacetic acid (8% by volume) was introduced dropwise via syringe to the stirred, refluxing (−25°) mixture. A pinkish color began to develop after 25% of the acid had been added. After 15 minutes the solution had become light tan in color and completely homogeneous. The reaction was quenched after 1½ hours by the slow addition of 10% $K_2CO_3$ in 50% aqueous methanol. Once quenched the reaction mixture was diluted carefully with 100 ml ether followed by another 100 ml of the 10% $K_2CO_3$ solution. The difluoroethane was allowed to boil away and the reaction was stirred overnight. The reaction was poured into water (200 ml) extracted with ether (3 × 100 ml) and finally worked up as usual. Evaporation of the solvent in vacuo left 2.614 g of crude $\Delta^1$-20-pregnanone (24) as a pale yellow oil ($\alpha/\beta$ ratio at C-17 85/15). The crude material was applied to 50 g of 100–200 mesh Florisil. Elution with 250 ml of hexane afforded 232 mg of non-polar materials. The desired tetracyclic ketone (24) was eluted with 1.5%, then 3% and 4% ether in hexane. A total of 1.620 g of ketone (24) was recovered for a yield of 65%. One of the fractions was recrystallized from 25% ethyl acetate in methanol to give white plates mp 101°–103° that rearranged into needles mp 113°–114.5°. Further recrystallization give white mp 102.5°–103.5°. From another cyclization white needles mp 114.5°–117.5° were obtained. When these crystals were dried at 68°/20 μ a small amount was observed to sublime and collect on a cold part of the apparatus, mp 119°–120°. However when the bulk was sublimed at 125°/25μ two forms were observed; mp 101.5°–102.5° and 111°–112°. All recrystallized samples are pure β-isomer at C-17.

Analysis: Calc'd for $C_{21}H_{32}O$: C, 83.94; H, 10.73; Found: dl: C, 84.05; H, 10.99; d C, 83.96; H, 10.81 Spectral Data:

| NMR: (CDCl$_3$) | 0.62 | δ | (s, | 3H, | C-18) |
| --- | --- | --- | --- | --- | --- |
| | 1.00 | | (s, | 3H, | C-19) |
| | 2.08 | | (s, | 3H, | C-21 —C—CH$_3$) |
| | 5.50 | | (s, | 2H, | C-1,2) |
| IR: (KBr) | 3.31 | μ | 3.35, | 3.40, | 3.47 (CH) |
| | 5.85 | | | 7.21, | 7.40 (m) |
| | 8.30, | | 8.47, | 8.68 | (all weak) |
| | 14.1 | (m) | | | |
| Mass Spec. (Atlas) | M+ | 300 | | | |
| | M− | 15 | (—CH$_3$) | | |
| | M− | 43 | (—C—CH$_3$) | | |
| | M− | 85 | (D ring cleavage) | | |
| | M− | 56 | (—C$_4$H$_8$ from A ring) | | |

$[\alpha]_D^{22} = +172°$

Example 16

Cyclization of Thiolketal 21 with Stannic Chloride

Into a 50 ml round-bottom blask fitted with a rubber serum cap and a magnetic stirrer was placed 247 mg (0.66 mmole) of thioketal (21) (optically active, from acid (14) with $[\alpha]_D^{21}$ −10.1°) and 20 ml of dry dichloromethane. This mixture was cooled to 0° with an ice bath and 0.5 ml (4.37 mmole, 6.6 eq) of stannic chloride was injected slowly. The first drop of acid turned the solution yellow which turned orange with additional acid. This orange solution was stirred for 15 minutes at 0° and then poured into aqueous 10% hydrochloric acid and extracted with ether. The ether extracts were washed with saturated sodium bicarbonate solution, brine and dried over anhydrous sodium sulfate. Concentration in vacuo afforded 243 mg (90% yield) of a vinyl sulfide mixture of the chlorocarbons (25) and (26) as a white semi-solid.

The nmr spectrum showed singlets at δ 0.87, 0.92, and 1.03 and a vinyl proton at δ 5.6.

Example 17

Cyclization of Thioketal (21) with Titanium Tetrachloride

Into a 50 ml round-bottom flask fitted with a magnetic stirrer and nitrogen inlet was placed 278 mg (0.744 mmole) of thioketal (23) and 20 ml of dry 1,2-dichloroethane. Cooled to −30° in an acetone/dry ice bath and 0.5 ml (4.5 mmole, 6 eq) of titanium tetrachloride was injected slowly. The first drop turned the solution orange which turned red and then deep purple with additional acid. This dark purple solution was stirred for 10 minutes at −30° to −25° and then poured into 75 ml of 10% aqueous hydrochloric acid and extracted with ether. The ether extracts were washed with saturated sodium bicarbonate solution, brine and dried over anhydrous sodium sulfate. Filtration and concentration in vacuo afforded 295 mg of a light yellow oil. This material was absorbed onto a silica gel plate (20 cm × 20 cm × 0.1 cm) and eluted with ethyl acetate:-hexane (1:4) to afford 242 mg (79% yield) of a clear oil which solidified on standing. Vpc on 3% XE-60/240° showed 4 peaks; 70% of compound (27) ($R_t$ = 12.25 min), 12% of compound (28) ($R_t$ = 14.25 min) and two other components of unknown structures, 15% ($R_t$ = 8.5 min) and 3% ($R_t$ 10.75 min). Recrystallization from hexane afforded white needles, mp 155°–158°, vpc of this material showed only the peaks corresponding to (27) and (28) in the same ratio as above.

NMR (CDCl$_3$): δ 0.83 (S), δ0.89 (S); δ2.14, and δ3.19 (S)

Mass Spec. (Atlas): M+ 410

Example 18

$\Delta^{1,17}$-20-chloro-pregnadiene (29) and $\Delta^1$, $\Delta^{17,17a}$-17-D-homopregnadiene (30)

In a 50 ml flask equipped with a magnetic stirrer bar were placed 0.150 g (0.50 mmoles) of the allylic alcohol (23) and 15 ml dry methylene chloride. This solution was chilled to −30° in a dry ice/acetone bath. The reaction mixture was stirred as 0.175 ml stannic chloride (3.0 equivalents) were added dropwise via syringe. A strong orange color developed after 1 equivalent of stannic chloride had been added. The cloudy orange solution was stirred at −20° to −30° for 75 minutes before 7 ml of dry ether was added followed by a slight excess of pyridine. The resulting precipitate was centrifuged and the white precipitate washed with methylene chloride. The supernatant was washed with 1N HCl then worked up in the usual fashion. Solvent evaporation in vacuo left 0.127 g of cloudy yellow oil. The crude material was chromatographed on 8 g of Florisil with hexane elution. 0.112 g of a clear colorless oil was recovered for a 70% yield. Vpc analysis (3% OV-17, 205°) showed a single peak (RT 10 min, 11.4%) and a doublet (RT 16 and 18 min, 88.6% Ratio 62/38). The above oil was recrystallized from hot absolute ethanol affording fine plates mp 100–106. Vpc analysis of these crystals showed only the doublet of peak in the ratio 61/39.

In another experiment 361 mg of the allylic alcohol (23) was cyclized in 36 ml of 1,1-dichloroethylene (freshly distilled from $K_2CO_3$ and hydroquinone). The above solution was chilled to −30° to −40° and the temperature was maintained in that range from 50 minutes after 0.35 ml stannic chloride (2.5 equivalents) had been added. This reaction was quenched with pyridine and worked up as previously described. Chromatography on Florisil with hexane yielded 246 mg of a clear colorless oil (64.5% yield). Vpc showed the same single peak (16.4%) and the same doublet; however the ratio of these two peaks was 85/15. Two recrystallizations from absolute ethanol yielded 92 mg of white plates mp 106°–109° (Ratio 88/12). It was subsequently shown that the doublet peaks are the tetracyclic chlorocarbons (29 and 30), the one with the shorter vpc retention time having a 5-membered D ring (29).

Analysis: Calc'd for $C_{21}H_{32}Cl$: C, 79.09; H, 9.80; Found: C, 79.24; H, 9.56
Spectral Data:

| NMR: | $(CDCl_3)$ | 0.87 δ | (s, | 3H, | C-18 in |
|---|---|---|---|---|---|
| | 0.93 | (s, | 3H, | C-18 in |
| | 1.00 | (s, | 3H, | C-19 |
| | 1.72 | (t, | 3H, | J=1.5 Hz, C-21) |
| | 2.13 | (m, | 2H, | C-16 H's) |
| | 5.52 | (s, | 2H, | C-1,2) |

IR: $(CHCl_3$ sol'n)
3.41μ 3.49 (CH)
6.00 (C=C)
9.18, 9.97, 10.43, 11.97
tlc: 20-ethyl acetate/hexane $R_f$ 0.63

Example 19

Degradation of Vinyl Sulfides (25) and (26) into 5 androstan-17-one (31)

The vinyl sulfide mixture 25/26 produced as in Example 15 is very difficult to separate. To separate the steroid (25) from the D-homo steroid (26), the mixture was subjected to a series of steps as follows:

a. Treatment 25/26 with Raney nickel. Into a 25 ml round-bottom flask was placed 190 mg (0.464 mmole if pure) of the above vinyl sulfide mixture 25/26, 10 ml of ethyl acetate, 5 ml of acetone and 1.139 g of wet (water) Raney nickel. The mixture was stirred at room temperature for 45 minutes and then refluxed for 30 minutes, cooled and filtered to afford a clear oil which by nmr still contained vinyl sulfide. This oil was retreated under the above conditions except that the mixture was refluxed for 2 hours, cooled, filtered to remove Raney nickel, the nickel washed several times with ethyl acetate. The organic washings were washed with brine and dried over anhydrous sodium sulfate. Filtration and evaporation in vacuo afforded 141 mg (92% yield) of the olefins 32/33. The vpc on 3% XE-60/188° showed four small peaks with $R_t$<4 minutes and 55% 26 ($R_t$ = 7 minutes), 32% 27 ($R_t$ = 8 minutes), and two other components of unknown structures, 12% ($R_t$ = 4.5 minutes) and 2% ($R_t$ = 6.25 minutes). This material coinjected with chloro olefin prepared as in Example 15.

b. Hydrogenation. The above olefins 32/33 (136 mg) were hydrogenated over ca. 50 mg of 10% Pd/C in 10 ml of ethyl acetate for 6 hours at room temperature. Filtration and evaporation of the solvent in vacuo afforded 118 mg (87%) of the chlorocarbons 34/35.

c. Ozonolysis. Chlorohydrocarbons 34/35 (118 mg) were dissolved in a mixture of 1 ml of methanol and 2 ml of ethyl acetate and the solution chilled to −78°. Ozone was bubbled through the solution until a permanent blue color was produced. The solution was allowed to stand for 5 minutes and the excess ozone was flushed from the solution with oxygen. Dimethylsulfide (0.5 ml) was then added at −78° with stirring and the solution stirred while warming to room temperature. After 30 minutes the solution was concentrated in vacuo to afford 134 mg of a yellow oil. Vpc on 3% XE-60/225° showed a peak at $R_t$ = 1.25 minutes (13%), 5β-androstan-17-one (31) at $R_t$ = 1.5 minutes (55%), the keto-ester (36) at $R_t$ = 5.75 minutes (26%) and a peak at $R_t$ = 9 minutes (6%). This material was absorbed onto a silica gel plate (20 cm × 20 cm × 0.1 cm) and eluted with ethyl acetate: hexane (1:4) to afford 3 bands, $R_f$ = 0.62, 0.42, and 0.27. The fastest moving band contained 22 mg of an oil containing four components by vpc which had no carbonyls in the infrared.

The slowest moving band contained 15 mg (11% yield) of the keto-ester (36). Vpc on 3% XE-60/225° showed one peak at $R_t$ = 5.75 minutes. This material was distilled bulb-to-bulb at 150°/0.02 mm to give a clear oil.

Analysis: Calc'd for $C_{22}H_{36}O_3$: C, 75.82; H, 10.41; O, 13.77; Found: C, 75.54; H, 10.05
IR (film): 5.74μ (C=O), 5.88μ (C=O)
NMR $(CDCl_3)$: δ 0.92(S), 1.11(S), 2.14(S), 3.63(S).
Mass Spec: $M^+$ 348

The middle band afforded 24 mg (25% yield) of 5β-androstan-17-one (31), $[\alpha]_D$ −48.5°. Vpc on 3% XE-60/180° showed 93% (31) at $R_t$ = 8 minutes, and 7% impurity at 6 minutes.

This material coinjected with the authentic material and the IR spectra were identical.
NMR $(CDCl_3)$ δ 0.85(S), 0.95(S)
IR $(CHCl_3)$ 5.78μ.

Example 20:

Degradation of Thioketals 27/28 into 5β-androstan-17-one (31)

Similarly the thioketal mixture 27/28 required degradation of the D-homo steroid (28) to provide a true steroid (31). This was accomplished by treatment with Raney nickel to remove the thioketal group followed by ozonolysis to produce the steroid (31), as follows:

a. Treatment with Raney nickel. Into a 25 ml round-bottom flask was placed 175 mg (0.426 mmole) of the thioketal 27/28 (containing 18% of another impurity), 15 ml of ethyl acetate, 5 ml of ethanol, and ca. 3 g of wet (water) Raney nickel. This mixture was stirred at room temperature for 4 hours (vpc showed all thioketal gone) filtered to remove Raney nickel and the nickel washed several times with ethyl acetate. The organic washings were washed with brine and dried over anhydrous sodium sulfate. Filtration and evaporation in vacuo afforded 109 mg (78% yield) of a clear oil. Nmr of this material showed some vinyl protons.

b. Ozonolysis. The above material was dissolved in a mixture of 1 ml of methanol and 3 ml of ethyl acetate and the solution chilled to −78°. Ozone was bubbled through the solution until a permanent blue color was produced. The solution was allowed to stand for 5 minutes and to excess ozone was flushed from the solution with oxygen. Dimethyl sulfide (0.5 ml) was then added at −78° with stirring and the solution stirred while warming to room temperature. After 30 minutes the solution was concentrated in vacuo to afford 140 mg of a yellow oil. This material was absorbed into a silica gel plate (20 cm × 20 cm × 0.1 cm) and eluted with ethyl acetate:hexane (1:4) to afford 21 mg (24% yield) of 5β-androstan-17-one (31) ($R_f$=0.5) as a clear oil. This material coinjected (3% XE-60, 220°) with the authentic material and the infrared spectra were similar.

Example 21:

$\Delta^1$-pregnen-3,20-dione (37)

In a 25 ml flask equipped with a magnetic stirring bar were placed 284 mg (0.95 mmoles) of the enone (24), 1.60 ml of glacial acetic acid, 0.40 ml acetic anhydride and 6 ml of tetrachloroethylene. The flask was placed in a 100° oil bath and the contents stirred. The oxidant solution was prepared immediately before use by adding 1.60 ml glacial acetic acid and 0.40 ml acetic anhydride to 2.75 ml of tertiary butyl chromate reagent (2.4 M in tetrachloroethylene, 7.0 equivalents). The chromate reagent solution was prepared according to the procedure of Heusler and Wetterstein (K. Huesler, A. Wetterstein, Helv. Chem. Acta 35, 384, (1952)) except that tetrachloroethylene was used rather than carbon tetrachloride. The oxidant solution was added over a 5 minute period to the stirred solution of the enone (24) at 100°. After 55 minutes at 100° the reaction vessel was allowed to cool and 5 ml of saturated aqueous oxalic acid was added, followed after 10 minutes by some solid oxalic acid. After another 10 minutes the reaction mixture was poured into a separatory funnel and extracted with ether (3 × 15 ml). The combined ether layers were washed with water then worked up as usual. Evaporation of the solvent in vacuo left the crude enedione (37), 0.253 g as a pale yellow viscous oil. Vpc analysis of this crude product showed 89% of the integrated area corresponded to the desired enedione (37). All of the above product was dissolved in the minimum amount of hexane are reflux, then allowed to cool to 23°. An oil came out of solution. On further cooling to −30° a white solid then a fluffy white product were precipitated. The supernatant was carefully removed by pipette. A total of 185 mg of material that was 95% pure by vpc was collected. The supernatant on cooling to −78° yielded more product (15 mg; total yield, 64%). Tlc (silica gel, ethyl acetate/hexane 1/1, $R_f$ 0.34) showed all the impurities remained in the −78° supernatant. A sample was purified by tlc (silica, ethyl acetate/hexane 1/1) followed by recrystallization from hexane (2 ×) that yielded white plates mp 127°–131°. Concentration of the mother liquor caused very fine needles mp 137°–138° to crystallize. Both crystalline forms were the pure 17β isomer.

Analysis: Calc'd for $C_{21}H_{30}O_2$: C, 80.21; H, 9.62; found: C, 79.96; H, 9.59

Spectral Data:

NMR: ($CCl_3$)  0.65  δ (s,  3H,  C-18)
               1.20   (s,   3H,  C-19)

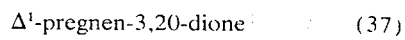

2.10   (s,   3H,   C-21 —C—CH₃)
5.92   (    1H,   J= 10 Hz C-2H)
6.89   (    1H,   J= 10 Hz C-1H)
IR: (KBr)  3.42  μ3.49  (CH)

5.86   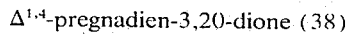   5.98

7.22,  7.41,  7.88, 8.25, 11.80

UV: $\lambda_{Max}^{CH_3OH}$ 230 Mμ ($\epsilon$ = 8,950)

Example 22

$\Delta^{1,4}$-pregnadien-3,20-dione (38)

In a 25 ml flask were placed 0.180 g (0.572 mmoles) of $\Delta^1$-pregnen-3,20-dione (37) 0.196 g (1.5 equivalents) of 2,3-dichloro-5,6-dicyano-benzoquinone, 0.140 g benzoic acid (2.0 equivalents) and 9 ml dry toluene. The flask was fitted with a condensor, degassed with nitrogen and placed in a 120° oil bath for 4 hours. The reaction mixture was then poured into saturated $NaHCO_3$ and extracted with ether (3×). The usual workup yielded 144 mg of brown oil. There was no trace of starting material by either tlc or vpc. The desired $\Delta^{1,4}$-pregnadien-3,20-dione (38) integrated to 88% of the vapor phase chromatogram. A sample was purified by recrystallization from ethyl acetate/hexane (2/1) to give colorless plates mp 175°–176°.

Analysis: Calc'd for $C_{21}H_{28}O_2$: C, 80.73; H, 9.03; Found: C, 80.68; H, 8.73

Spectral Data:

NMR: ($CDCl_3$)  0.685  (s,  3H,  C-18)
                 1.22   (s,  3H,  C-19)
                 2.08   (s,  3H,  C-21)
                 6.03   (m,  1H,  C-4, $J_{2,4}$=2Hz)
                 6.16   (q         C-2, $J_{1,2}$=10Hz, $J_{2,4}$=2Hz)
                 6.99   (d   1H,  C-1, $J_{1,2}$=10Hz)
IR: ($CHCl_3$ sol'n)  3.32μ  3.38, 3.48 (CH)

5.88    CH₃6.02
6.17   (m) (C=C of A-ring)
7.35,  7.70, 11.00, 11.22

Example 23:

Progesterone (39)

In a 50 ml flask equipped with a stopcock sidearm and stirrer bar were placed 144 mg of crude dienedione (38) and 30 mg Rh (Pφ₃)₃ I catalyst. The flask was thoroughly degassed with hydrogen before 7 ml of toluene/absolute ethanol (1/1, nitrogen degassed) was added via syringe. The flask was stirred under a positive pressure of hydrogenation. The resulting pale yellow orange solution was stirred 8 hours. The flask was removed from the hydrogenation apparatus and stirred in air. After solvent removal, the residue was taken up in 50% ethyl acetate in hexane then filtered through a celite/glass wool plug. Evaporation of the filtrate in vacuo left a pale brown oil, 118 mg. Vpc analysis showed that 17% of the starting material was not hydrogenated. In other experiments complete hydrogenation of the 1,2 bond has been effected. The desired product was separated from the starting material by thick layer chromatography with 2 developments in 25% ethyl acetate in hexane followed by one development in 50% ethyl acetate in hexane. Only 44 mg of crude dl-progesterone (39) was recovered. Recrystallization from methanol gave colorless plates mp 174°–184°.

Spectral Data:
| NMR: (CDCl₃) | 0.67 δ | (s, | 3H, | C-18) |
|---|---|---|---|---|
|  | 1.18 | (s, | 3H, | C-19) |
|  | 2.12 | (s, | 3H, | C-21) |
|  | 5.78 | (s, | 1H, | C-4) |
| IR: (KBr) | 3.35μ | 3.38, | 3.40 | (CH) |
|  | 5.87 | $\left(\overset{O}{\underset{\|\|}{\overset{}{C}}}CH_3\right)$ 6.00 | | |
|  | 7.35, | 7.83, 8.60, 10.53, 11.45 | | |
This sample's nmr and ir spectra were identical to the spectra of both natural progesterone and dl-progesterone.
We claim:
1. Compounds of formula
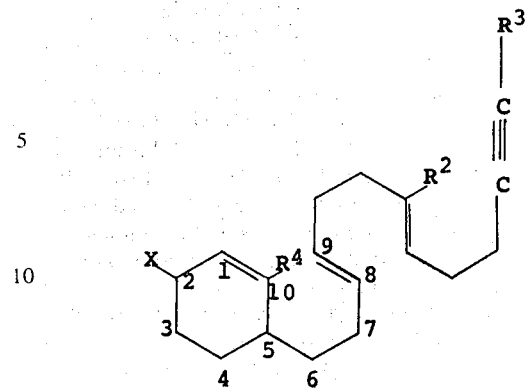
wherein $R^2$, $R^3$ and $R^4$ are hydrogen or methyl; X is hydroxyl.
* * * * *